United States Patent
Kucharewski et al.

(10) Patent No.: US 10,911,846 B2
(45) Date of Patent: Feb. 2, 2021

(54) LEAF SWITCH MODULE AND OPTOELECTRONIC SWITCH

(71) Applicant: ROCKLEY PHOTONICS LIMITED, London (GB)

(72) Inventors: Nicholas Kucharewski, San Jose, CA (US); Cyriel Johan Agnes Minkenberg, Neuheim (CH); German Rodriguez Herrera, Oberengstringen (CH)

(73) Assignee: Rockley Photonics Limited, Oxford (GB)

( * ) Notice: Subject to any disclaimer, the term of this patent is extended or adjusted under 35 U.S.C. 154(b) by 0 days.

(21) Appl. No.: 16/496,337

(22) PCT Filed: Mar. 22, 2018

(86) PCT No.: PCT/EP2018/057363
§ 371 (c)(1),
(2) Date: Sep. 20, 2019

(87) PCT Pub. No.: WO2018/172484
PCT Pub. Date: Sep. 27, 2018

(65) Prior Publication Data
US 2020/0037055 A1    Jan. 30, 2020

Related U.S. Application Data

(60) Provisional application No. 62/475,708, filed on Mar. 23, 2017, provisional application No. 62/489,909, (Continued)

(51) Int. Cl.
*H04Q 11/00* (2006.01)
*H04L 12/933* (2013.01)

(52) U.S. Cl.
CPC ....... *H04Q 11/0071* (2013.01); *H04L 49/109* (2013.01); *H04Q 11/0066* (2013.01)

(58) Field of Classification Search
CPC .......... H04Q 11/0071; H04Q 11/0066; H04Q 11/0062; H04Q 11/0003
See application file for complete search history.

(56) References Cited

U.S. PATENT DOCUMENTS

| | | | |
|---|---|---|---|
| 2010/0254703 A1 | 10/2010 | Kirkpatrick et al. | |
| 2016/0007102 A1* | 1/2016 | Raza | H04L 49/253 398/45 |

(Continued)

FOREIGN PATENT DOCUMENTS

WO    WO 2016/004340 A1    1/2016

OTHER PUBLICATIONS

International Search Report and Written Opinion of the International Searching Authority, dated Jun. 15, 2018, Corresponding to PCT/EP2018/057363, 16 pages.

*Primary Examiner* — Dzung D Tran
(74) *Attorney, Agent, or Firm* — Lewis Roca Rothgerber Christie LLP

(57) ABSTRACT

Various leaf switch modules including optical network interfaces, electrical network interfaces and packet processors are provided. Some of the leaf switch modules as described herein are adapted for upward transmission of signals from external client devices to an electrical fabric, and include O/E converters; other leaf switch modules are adapted for downward transmission of signals from an electrical fabric to external client devices, and include E/O converters. A third type of leaf switch as described herein is adapted for both upward and downward transmission of signals, and includes both types of converter. In addition to the leaf (Continued)

switch modules themselves, an optoelectronic switch containing a plurality of those leaf switches is also described.

25 Claims, 6 Drawing Sheets

Related U.S. Application Data filed on Apr. 25, 2017, provisional application No. 62/570,048, filed on Oct. 9, 2017.

(56) References Cited

U.S. PATENT DOCUMENTS

| | | | |
|---|---|---|---|
| 2016/0131862 A1 | 5/2016 | Rickman et al. | |
| 2016/0337726 A1* | 11/2016 | Yan | H04L 49/15 |
| 2018/0024957 A1* | 1/2018 | Nachimuthu | G06F 3/0625 |
| | | | 711/170 |
| 2019/0253777 A1* | 8/2019 | Yang | H04Q 11/00 |

* cited by examiner

LEAF SWITCH MODULE AND OPTOELECTRONIC SWITCH

CROSS-REFERENCE TO RELATED APPLICATION(S)

This application is a national stage entry, under 35 U.S.C. § 371, of International Application Number PCT/EP2018/057363, filed on Mar. 22, 2018, which claims priority to and the benefit (i) of U.S. Provisional Patent Application No. 62/475,708, filed Mar. 23, 2017, (ii) of U.S. Provisional Patent Application No. 62/489,909, filed Apr. 25, 2017, and (iii) of U.S. Provisional Patent Application No. 62/570,048, filed Oct. 9, 2017. The entire contents of all of the applications identified in this paragraph are incorporated herein by reference.

TECHNICAL FIELD OF THE INVENTION

The present invention relates to a leaf switch module which may be used in an optoelectronic switch, and an optoelectronic switch containing that leaf switch module.

BACKGROUND TO THE INVENTION

Many network chassis are built using an internal Ethernet network of multiple Ethernet switches having all electrical inputs and output (IO). In order to perform switching, these chassis use optical transceiver modules to convert the electrical signals inside the chassis into optical signals, which are then incident on optical IOs, in order to connect to the remainder of the network. These transceiver modules provide only conversion and translation, with no other function, such as switching capability.

Previous innovations by the inventors have enabled integration of all-optical IOs directly with the switching functionality, but these products offered a lower bandwidth (i.e. a lower port count) than the electrical switches that they replaced, and required more devices. These previous arrangements relied on several bands of transceiver modules and an optical fabric, rather than the internal Ethernet fabric.

FIGS. 4A to 4D show prior art modules which may be used in optoelectronic switches:

FIG. 4A shows a "dumb" transceiver, a device which converts electrical signals into optical signals and vice versa. Transceivers are usually built by combining a photonics integrated circuit (PIC) that converts the light signals into electrical signals, an analogue unit that interprets the values encoded by the electrical signals received from the PIC and a SerDes unit that converts the interpreted values into analogue electrical signals.

FIG. 4B shows a purely optical switch module, which sends and receives optical signals by dynamically connecting input ports to output ports. Optical switches such as that shown in FIG. 4B do not process the packets at all, and work as circuit switches, i.e. electrical signals instruct the digital logic to establish new optical circuits: connections from inputs to outputs, and light is routed from inputs to outputs without further processing.

FIG. 4C shows an electrical packet switch which operates exclusively in the electrical domain. In order to be connected to optical devices, they have to be complemented with transceivers.

FIG. 4D shows an optoelectronic packet switch module, in which silicon photonics are combined with a packet switch. These devices are able to perform packet processing at the electrical level, and then to convert those packets to light through photonic units, for transmission.

The present invention provides switch modules which differ significantly from the modules depicted in FIGS. 4A to 4D, and which provide advantages relative to all of them.

SUMMARY OF THE INVENTION

The present invention demonstrates advantages over the devices described in the previous section by providing what is effectively a packet switching transceiver module, which is able to provide both electrical-optical conversion and packet switching functionality, by having a mix of electrical and optical IO. This allows it to use electrical Ethernet interfaces to connect to other components inside the chassis and optical IO to connect to the network, or perhaps to other components in the chassis. The features are explained in more depth later on in the application.

Additional aspects of the invention provide for optoelectronic switches including a combination of conventional all-electrical Ethernet switches offering higher bandwidth.

A first aspect of the present invention provides a leaf switch module for use in an optoelectronic switch, the leaf switch module including:

a plurality of optical network interfaces, arranged to receive a plurality of optical signals, each optical signal received from an external client device;

a plurality of optical-to-electrical (O/E) converters, each arranged to convert a respective optical signal of the plurality of optical signals into a corresponding electrical signal, to generate a plurality of electrical signals;

a plurality of electrical network interfaces; and a packet processor arranged to switch each of the plurality of electrical signals towards a respective electrical network interface of the plurality of electrical network interfaces, each of the electrical network interfaces arranged to transmit a respective electrical signal of the plurality of electrical signals to an electrical fabric.

Notice that in this invention, the switching is done electronically, even if the nature of some of the signals received/transmitted is optical, i.e., as a whole, the module or switch is an "optoelectronic" one (there is an optical to electrical conversion preceding the switching and an electrical to optical conversion succeeding the switching), but notice also that the invention relates to switches that receive/transmit both electrical and optical signals (and not just to switches that are optoelectronic but only provide optical network interfaces to receive/transmit from/to the outside world).

Here, the terms "electrical network interface" and "optical network interface" refer to features which allow the leaf switch module to connect or communicate respectively with electrical components or optical components. In other words, the electrical network interfaces facilitate electrical communication or connection between the leaf switch module and an electrical component, and the optical network interfaces facilitate optical communication or connection between the leaf switch module and an optical component.

In the above, it should be noted that the electrical fabric is not part of the switch module itself. The electrical network interfaces are arranged to interface with an electrical fabric which is preferably part of an optoelectronic switch in which the leaf switch module is to be used. The term "electrical fabric" here refers to an electrical interconnecting region which may, for example, contain a plurality of conductive paths which connect leaf switch modules of the present aspect of the invention with additional switch modules, which may be referred to as spine switches. The components set out above in respect of the first aspect of the present invention are arranged to convey the signals in an "upward" direction, i.e. from the external device towards the electrical fabric. The same modules may also be arranged to convey signals in a "downward" direction, i.e. from the electrical fabric towards the external client device. This is discussed later on in the application, in particular with reference to the second and third aspects of the present invention.

In preferred embodiments of the first aspect of the present invention, the electrical network interfaces are provided by, or in the form of, electrical ports. Similarly, in preferred embodiments of the first aspect of the invention, the optical network interfaces are provided by, or in the form of optical ports. Throughout this application, where electrical or optical network interfaces are mentioned, these terms are effectively interchangeable with electrical or optical ports.

In other embodiments of the invention, the electrical network interfaces and/or optical network interfaces may be provided by configurable ports. Herein, the term "configurable port" should be understood to refer to an arrangement wherein it is possible to configure the port in question to provide either an electrical network interface or an optical network interface. In preferred embodiments, the configurable ports include components configured to provide both an electrical network interface and an optical network interface, though only one of those interfaces is usable. In that way, at the manufacturing stage, it is possible to select whether a given configurable port is to provide either an electrical network interface or an optical network interface. The presence of configurable ports greatly enhances the flexibility of the leaf switch modules, allowing the manufacturer to configure the leaf switch modules in order to best fit their specific intended use. More specifically, the configurable port may include two alternative circuits, one for the provision of an electrical network interface, and another for the provision of an optical network interface. The packet processor may connect, for each configurable port, to one of the two alternative circuits in order to effect provision of an electrical network interface or an optical network interface. Such a connection to either alternative may happen at the manufacturing or assembly stage of the leaf switches.

In particularly preferred embodiments of the first aspect of the present invention, there may be a mixture of permanent (i.e. non-configurable) ports and configurable ports. For example, in some embodiments, the optical network interfaces may be provided by a combination of non-configurable optical ports, and configurable ports which are configured to provide an optical network interface. In some embodiments, all of the electrical network interfaces may be provided by configurable ports which are configured to provide electrical network interfaces (i.e. there are no non-configurable electrical ports).

In some embodiments, there may be N non-configurable optical ports and M configurable ports. Then, there may be $P_{opt}$ optical network interfaces in total on a given leaf switch module, where $P_{opt} \leq M+N$, and $P_{ele}$ electrical network interfaces, with $P_{ele} \leq M$. Then, necessarily, for any configuration: $P_{opt}+P_{ele} \leq M+N$. Clearly, in embodiments in which the leaf switch module does not include any non-configurable optical ports (i.e. the optical network interfaces are provided only by the configurable ports), N is equal to zero.

Alternatively, in some embodiments, there may be $N_e$ non-configurable electrical ports, $N_o$ non-configurable optical ports, where $N_o+N_o=N$ and M' configurable ports. In this case, Then, there may be $P_{opt}$ optical network interfaces in total on a given leaf switch module where $P_{opt} \leq M+N_o$, and $P_{ele}$ electrical network interfaces, with $P_{ele} \leq M+N_e$. Then, necessarily, for any configuration: $P_{opt}+P_{ele} \leq M+N$.

Please note that throughout this application, the terms "optical port" and "electrical port" may be used to refer respectively to "a configurable port providing an optical network interface" and "a configurable port providing an electrical network interface".

It should be stressed here that the components (i.e. the optical network interfaces, the O/E converters, the packet processor, and the electrical network interfaces) are all part of the same package, which is preferably an integrated package. The integrated combination of the O/E converters and the packet processor thus provides what is effectively an integrated multi-port transceiver device with switching capability. This means that in optoelectronic switches employing the leaf switch modules, the number of tiers in the network architecture can be reduced by one. This reduces the number of switch modules which would otherwise make up the highest tier and represents a significant advantage over known systems employing a tier of discrete (i.e. passive, or dumb) transceivers and an extra layer of leaf switch modules. The resulting reduction in the number of necessary tiers further leads to increased linear scalability of the network architecture built upon such switches up to a certain point without increased oversubscription. A traditional switch generally relies on dumb transceivers and electrical switching elements only, and would require an additional tier of switches to scale up the network. Our invention (up to a certain point) does not require that extra tier, since the invention combines electro-optical conversion, switching and packet processing ability and leads to advanced routing and load balancing capability from the plurality of client ports to the plurality of spine ports. In summary, the invention provides, in an economically advantageous way, the functionality and performance that a scaled up network would achieve without requiring an extra tier of switches.

In some embodiments, the leaf switch module of the present invention is configured to perform local optical switching. By local optical switching, we refer to switching of a signal from one optical network interface to another optical interface on the same leaf switch module, without traversing the electrical. In other embodiments, the leaf switch module may be configured to perform local electrical switching, in which an electrical signal is switched from one electrical network interface to another electrical network interface, without traversing the fabric. This may be used to deal with faulty links, or for testing purposes.

An additional way to avoid adding an extra tier when scaling up a system can be realized at the expense of increasing oversubscription: our invention also supports that kind of scaling with the degree oversubscription being easily controlled by means of the configurable ports.

In this application, the optical network interfaces are preferably arranged to receive the optical signals from an external client device from or via a respective optical fibre. It should be noted that the plurality of optical signals may be received from a respective plurality of external client devices, or in some cases, more than one signal may be received from a given external client device.

The presence of the O/E converters and the electrical network interfaces means that signals may be switched across the electrical fabric. This functionality can provide significant advantages relative to an optical fabric. For example, by using an electrical fabric as discussed, it is possible to combine conventional Ethernet interfaces with other components such as spine switch modules located inside an optoelectronic switch including such leaf switch modules. This combination is advantageous because all-electrical spine switch modules generally offer higher bandwidth at higher power, although only up to a certain path lengths (e.g. up to 3 metres). It is, therefore, advantageous to have optical/electrical modules which are located close to each other and whose electrical ends are switched via an electrical fabric and electrical spine switch modules. Optoelectronic switches containing the leaf switch modules of the first and other aspects of the invention are discussed in more detail later in the application.

In preferred embodiments of the present invention, the packet processor does not perform a passive role, and instead takes on an active switching role. Specifically, the packet processor preferably includes a plurality of upward-facing inputs, each configured to receive a respective electrical signal of the plurality of electrical signals, a switching component and a plurality of upward-facing outputs. Once an electrical signal is received by a respective one of the downward-facing inputs of the packet processor, the switching component is configured to switch that electrical signal to a respective one of the plurality of upward-facing outputs, based on information contained in the electrical signal. For example, the optical signals and corresponding electrical signals may be in the form of packets of data, each packet containing a packet header. The information on which the selection of an upward-facing output of the packet processor is based may be referred to as destination information, and may be contained in the packet header. In some embodiments, after switching has taken place, the destination information may be removed from the packet header. In order to determine to which upward-facing output of the packet processor to direct each electrical signal, the packet processor may provide capabilities for one or more of the following: header parsing, packet filtering tables, access control lists and routing lookup tables.

In addition, the packet processor may provide electronic buffers, or in other words, it may include an electronic buffering module, arranged to temporarily store data, preferably packets of data, which cannot be immediately switched to a corresponding upward-facing output of the packet processor. This buffering may be required in cases where it is necessary or preferable to avoid excessive packet drops, and in case multiple packets of data simultaneously contend for the same optical or electrical port.

The packet processing features outlined above, and in particular the active switching capability, serve to distinguish the leaf switch modules of the present invention from conventional "dumb" transceiver modules. Furthermore, the integrated optical network interfaces distinguish it from conventional electrical packet switching modules.

In addition to the above, the leaf switch module of the first aspect of the invention, preferably the packet processor thereof, may provide one or more of the following: line rate forwarding for all packet sizes, quality of service (QoS), link aggregation groups (LAG), virtual LANs (VLAN), priority flow control (PFC), enhances transmission selection (ETC), multicast/broadcast, and statistics gathering.

The switching functionality provided by the packet processor of the leaf switch module, as discussed above, serves to provide connectivity from any of the optical network interfaces and any of the electrical network interfaces (and vice versa, see later). This connectivity enables the implementation of a load balancing capability, where signals entering on one side (i.e. at the optical network interfaces) can be evenly load balanced across the electrical network interfaces on the other side. Load balancing is a key capability of the leaf switch module. It is particularly useful in optoelectronic switches including multi-tier Folded Clos architectures, where there are multiple paths of the same length to each other leaf switch module in the plurality of leaf switch modules. Load balancing attempts to achieve an equal load distribution across all paths to a given destination leaf.

In this and other aspects of the invention, load balancing and routing at the leaf switch module may include: LAG, ETS, PFC, QoS, Multicast and the like. It may also include hash-based or other load-balancing techniques, such as L3 routing, and ECMP Groups. VLAN/etc. support may also be employed.

In order for the packet processor to perform any or all of the above, it is preferably in the form of, or located on, an electronic integrated circuit, such as a CMOS integrated circuit (which may be referred to herein just as a "CMOS") or "chip" containing the required circuitry.

The O/E converters are preferably in the form of photodetectors, in particular photodiodes. In some embodiments of the present invention, the O/E converters are preferably located on a photonics chip which is coupled to the electronics integrated circuit discussed in the previous paragraph. It is preferred that the photonics chip and the electronic integrated circuit are coupled together onto a single module, or integrated into a single module. This is in contrast, for example, to an arrangement in which the O/E converters (i.e. a transceiver module) is separate from the packet processor. Such integration leads to an improvement in the compactness and scalability of optoelectronic switches including leaf switch modules according to embodiments of the first aspect of the present invention. By being closer, the need for an extra serialization/deserialization circuit in the path between the converter and the switch chips is avoided. The need for an additional retimer chip is also avoided, since the signal/noise ratio between the converter and the chip is avoided. Integrated components also remove the need to manage an external discrete element, i.e. an external transceiver which does not form part of the switch module.

In additional preferred embodiments of the first aspect of the present invention, the leaf switch module may provide Bridge Port Extension (802.1BR) capability. Similarly, the leaf switch module may provide Ethernet Bridging (Layer 2) capability. Similarly, again, the leaf switch module may provide IP routing capability (Layer 3).

The first aspect of the invention is directed towards the upward-facing capabilities and features of the leaf switch module. However, as will be clear to the skilled person, the same advantages may be achieved in respect of downward-travelling signals. Accordingly, a second aspect of the invention is directed towards a similar leaf switch module whose features are adapted for the conveyance and processing of downward-travelling signals. It will be apparent that an especially preferred for a leaf switch module is one which includes the features of both the first and second aspects of the present invention. This will be discussed in detail later on in the application.

With the above in mind, a second aspect of the present invention provides a leaf switch module for use in an optoelectronic switch, the leaf switch module including:
   a plurality of electrical network interfaces, each arranged to receive a respective electrical signal of a plurality of electrical signals from an electrical fabric;
   a packet processor;
   a plurality of electrical-to-optical (E/O) converters; and
   a plurality of optical network interfaces;

wherein:
the packet processor is arranged to switch each of the plurality of electrical signals towards a respective E/O converter of the plurality of E/O converters;
each of the plurality of E/O converters is arranged to convert a respective electrical signal of the plurality of electrical signals into a corresponding optical signal, to generate a plurality of optical signals; and
each of the optical network interfaces is arranged to receive a respective optical signal of the plurality of optical signals, and to transmit that optical signal towards an external client device.

As with the first aspect of the invention, the terms "electrical network interface" and "optical network interface" refer to features which allow the leaf switch module to connect or communicate respectively with electrical components or optical components. In other words, the electrical network interfaces facilitate electrical communication or connection between the leaf switch module and another electrical component, and the optical network interfaces facilitate optical communication or connection between the leaf switch module and another optical component.

As with the first aspect of the present invention, it should again be noted that the electrical fabric is not part of the switch module itself. The electrical network interfaces are arranged to interface with an electrical fabric which is preferably part of an optoelectronic switch in which the leaf switch module is to be used. The term "electrical fabric" here takes the same meaning as for the first aspect of the invention.

In preferred embodiments of the second aspect of the present invention, the electrical network interfaces are provided by, or in the form of, electrical ports. Similarly, in preferred embodiments of the second aspect of the invention, the optical network interfaces are provided by, or in the form of optical ports. Throughout this application, where electrical or optical network interfaces are mentioned, these terms are effectively interchangeable with electrical or optical ports.

In other embodiments of the invention, the electrical network interfaces and/or optical network interfaces may be provided by configurable ports. Herein, the term "configurable port" should be understood to refer to an arrangement wherein it is possible to configure the port in question to provide either an electrical network interface or an optical network interface. In preferred embodiments, the configurable ports include the components required for both an electrical network interface and an optical network interface, though only one of those interfaces is usable. In that way, at the manufacturing stage, it is possible to select whether a given configurable port is to provide either an electrical network interface or an optical network interface. The presence of configurable ports greatly enhances the flexibility of the leaf switch modules, allowing the manufacturer to configure the leaf switch modules in order to best fit their specific intended use. More specifically, the configurable port may include two alternative circuits, one for the provision of an electrical network interface, and another for the provision of an optical network interface. During manufacture or assembly of the leaf switch modules, the packet processor may then be connected to one of these circuits.

In particularly preferred embodiments of the present invention, there may be a mixture of permanent (i.e. non-configurable) ports and configurable ports. For example, in some embodiments, the optical network interfaces may be provided by a combination of non-configurable optical ports, and configurable ports which are configured to provide an optical network interface. In some embodiments, all of the electrical network interfaces may be provided by configurable ports which are configured to provide electrical network interfaces (i.e. there are no non-configurable electrical ports).

In some embodiments, there may be N non-configurable optical ports and M configurable ports. Then, there may be $P_{opt}$ optical network interfaces in total on a given leaf switch module, where $P_{opt} \leq M+N$, and $P_{ele}$ electrical network interfaces, with $P_{ele} \leq M$. Then, necessarily, for any configuration: $P_{opt}+P_{ele} \leq M+N$. Clearly, in embodiments in which the leaf switch module does not include any non-configurable optical ports (i.e. the optical network interfaces are provided only by the configurable ports), N is equal to zero.

Alternatively, in some embodiments, there may be $N_e$ non-configurable electrical ports, $N_o$ non-configurable optical ports, where $N_o+N_e=N$ and M' configurable ports. In this case, Then, there may be $P_{opt}$ optical network interfaces in total on a given leaf switch module where $P_{opt} \leq M+N_o$, and $P_{ele}$ electrical network interfaces, with $P_{ele} \leq M+N_e$. Then, necessarily, for any configuration: $P_{opt}+P_{ele} \leq M+N$.

It should be stressed here that the components (i.e. the optical network interfaces, the E/O converters, the packet processor, and the electrical network interfaces) are all part of the same package, which is preferably an integrated package. The integrated combination of the E/O converters and the packet processor thus provides what is effectively an integrated multi-port transceiver device with switching capability. This means that in optoelectronic switches employing the leaf switch modules, the number of tiers in the network architecture can be reduced by one. The result is a reduction in the number of switch modules which would otherwise make up the highest tier, which reduction represents a significant advantage over known systems employing a tier of discrete (i.e. passive, or dumb) transceivers and an extra layer of leaf switch modules. The reduction in the number of necessary tiers leads to increased linear scalability of the network architecture built upon such switches up to a certain point without increased oversubscription. A traditional switch generally relies on dumb transceivers and electrical switching elements only, and would require the addition of an additional tier of switches to scale up the network. Our invention (up to a certain point) does not require that extra tier. The elimination of the extra tier is a result of combining electro-optical conversion, switching and packet processing ability enabling advanced routing and load balancing capability from the plurality of client ports to the plurality of spine port. In summary, the invention provides, in an economically advantageous way, the functionality and performance that a scaled up network would achieve without requiring an extra tier of switches.

An additional way to avoid adding an extra-tier when scaling up a system can be realized at the expense of increasing oversubscription: our invention also supports that kind of scaling with the degree oversubscription being easily controlled by means of the configurable ports.

In this application, the optical network interfaces are preferably arranged to transmit the respective optical signals to an external client device via a respective optical fibre. It should be noted that the plurality of optical network interfaces may be arranged to transmit the plurality of optical signals each to a respective client device, or in some cases, more than one of the plurality of optical signals may be transmitted to a given external client device.

The presence of the E/O converters and the electrical network interfaces means that signals may be received, having been switched across the electrical fabric. This provides the same advantages as discussed with reference to the first aspect of the invention.

In preferred embodiments of the second aspect of the present invention, as with the first, the packet processor does not perform a passive role, and instead takes on an active switching role. Specifically, the packet processor preferably includes a plurality of upward-facing inputs, each configured to receive a respective electrical signal of the plurality of electrical signals, a switching component and a plurality of downward-facing outputs. Once an electrical signal is received by a respective one of the upward-facing inputs of the packet processor, the switching component is configured to switch that electrical signal to a respective one of the plurality of downward-facing outputs, based on information contained in the electrical signal. For example, the electrical signals may be in the form of packets of data, each packet containing a packet header. The information on which the selection of a downward-facing output of the packet processor is based may be referred to as destination information, and may be contained in the packet header. In some embodiments, after switching has taken place, the destination information may be removed from the packet header. In order to determine to which downward-facing output of the packet processor to direct each electrical signal, the packet processor may provide capabilities for one or more of the following: header parsing, packet filtering tables, access control lists and routing lookup tables.

In addition, the packet processor module may provide electronic buffers arranged to temporarily store data, preferably packets of data, which cannot be immediately switched to a corresponding downward-facing output of the switching element. This functionality may be required in cases where it necessary or preferable to avoid excessive packet drops, and in case multiple packets of data simultaneously contend for the same optical or electrical port.

The packet processing features outlined above, and in particular the active switching capability, serve to distinguish the leaf switch modules of the present invention from conventional "dumb" transceiver modules. Furthermore, the integrated optical network interfaces distinguish it from conventional electrical packet switching modules.

In addition to the above, the leaf switch module of the first aspect of the invention, preferably the packet processor thereof, may provide one or more of the following: line rate forwarding for all packet sizes, quality of service (QoS), link aggregation groups (LAG), virtual LANs (VLAN), priority flow control (PFC), enhances transmission selection (ETC), multicast/broadcast, and statistics gathering.

The switching functionality provided by the packet processor of the leaf switch module, as discussed above, serves to provide connectivity from any of the electrical network interfaces and any of the optical network interfaces. This connectivity enables the implementation of load balancing capability, as described above with respect to the first aspect of the invention, where signals entering on one side (i.e. at the electrical network interfaces) can be evenly load balanced across the optical network interfaces on the other side.

In order for the packet processor to perform any or all of the above, it is preferably in the form of an electronic integrated circuit, such as a CMOS integrated circuit or "chip" containing the required circuitry.

The E/O converters are preferably in the form of modulators such as electro-absorption modulators or EAMs. The modules may be coupled to downward-facing output fibres coupled to the optical network interfaces. The modulators may each be coupled to a laser input fibre for receiving power from an external laser. In some embodiments, the leaf switch module may instead include a plurality of modulated lasers coupled to downward-facing output fibres.

In some embodiments of the present invention, the E/O converters are preferably located on a photonics chip which is coupled to the electronics integrated circuit discussed in the previous paragraph. It is preferred that the photonics chip and the electronic integrated circuit are coupled together onto a single module, or integrated together. This is in contrast, for example, to an arrangement in which the E/O converters (i.e. a transceiver module) is separate from the packet processor. Such integration leads to an improvement in the compactness and scalability of optoelectronic switches including leaf switch modules according to embodiments of the second aspect of the present invention. By being closer, the need for an extra serialization/deserialization circuit in the path between the converter and the switch chips is avoided. The need for an additional retimer chip is also avoided, since the signal/noise ratio between the converter and the chip is avoided. Integrated components also remove the need to manage an external discrete element, i.e. an external transceiver which does not form part of the switch module.

In additional preferred embodiments of the second aspect of the present invention, the leaf switch module may provide Bridge Port Extension (802.1BR) capability. Similarly, the leaf switch module may provide Ethernet Bridging (Layer 2) capability. Similarly, again, the leaf switch module may provide IP routing capability (Layer 3).

In order to operate best in an optoelectronic switch, it is preferred that the leaf switch modules are equipped to perform the functionality of the leaf switch modules of both the first and second aspects of the present invention. Such a leaf switch module is provided by the third aspect of the invention, namely a leaf switch module for use in an optoelectronic switch having:

a plurality of optical network interfaces;
a plurality of O/E converters;
a first packet processor;
a plurality of electrical network interfaces;
a second packet processor; and
a plurality of E/O converters,
wherein:
   the plurality of optical network interfaces is arranged to receive a first plurality of optical signals, each optical signal of the first plurality of optical signals received from an external client device;
   each O/E converter in the plurality of O/E converters is arranged to convert a respective optical signal of the first plurality of optical signals into a corresponding electrical signal, to generate a first plurality of electrical signals;
   the first packet processor is arranged to switch each of the first plurality of electrical signals towards a respective electrical port of the plurality of electrical network interfaces, each of the electrical network interfaces arranged to transmit a respective electrical signal of the first plurality of electrical signals to an electrical fabric, and
wherein:
   the plurality of electrical network interfaces is arranged to receive a respective electrical signal of a second plurality of electrical signals from an electrical fabric;
   the second packet processor is arranged to switch each of the second plurality of electrical signals towards a respective E/O converter of the plurality of E/O converters;

each of the plurality of E/O converters is arranged to convert a respective electrical signal of the second plurality of optical signals into a corresponding optical signal, to generate a second plurality of optical signals; and each of the optical network interfaces is arranged to receive a respective optical signal from the second plurality of optical signals, and to transmit that optical signal to an external client device.

Leaf switch modules of the third aspect of the invention have the same features as a combination of the first and second aspects of the invention. For clarity, the pluralities of optical and electrical signals which have been described with reference to the first aspect of the invention are referred to as respective "first" pluralities, and the pluralities of optical and electrical signals which have been described with reference to the second aspect of the invention are referred to as respective "second" pluralities. The optional features presented above with reference to the leaf switch modules of the first and second aspects of the present invention apply equally well to the third aspect of the invention, where compatible. In particular, we note that the provision of the electrical and optical network interfaces by various electrical, optical, and/or configurable ports applies equally well to the third aspect of the invention.

It should be stressed again here, that all of the components set out above, which are included in the leaf switch module of the third aspect of the invention, are preferably all included in the same package, which is preferably an integrated package. This integration provides the same advantages as regards the reduction in number of tiers and resultant increased scalability as has been described in more detail for the first and second aspects of the invention.

In some embodiments of the third aspect of the present invention, the O/E converters and E/O converters may be located on the same photonics chip. Of course, in other embodiments, the O/E converters may be located on a first photonics chip, and the E/O converters may be located on a second photonics chip.

In some embodiments of the third aspect of the invention, the first packet processor and the second packet processor are separate components, which may be in the form of, or located on, first and second electronic integrated circuits respectively. However, it is preferred that the first packet processor and the second packet processor are the same component, which may be referred to herein, particularly with reference to such embodiments of the third aspect of the invention as "the packet processor". Such a packet processor requires switching capability in both the upward and downward directions, and preferably includes: upward-facing inputs, upward-facing outputs, downward-facing inputs and downward-facing outputs. In preferred embodiments, the downward-facing inputs and downward-facing outputs are located together in pairs, which may be referred to as the client-side IOs of the packet processor. Similarly, the upward-facing outputs and the upward-facing inputs may also be located together in pairs, which may be referred to as fabric-side IOs of the packet processor. The packet processor may include a first switching component for switching in the upward direction, and a second switching component for switching in the downward direction. However, in preferred embodiments, a single switching component is responsible for switching in both directions.

In the same way that the inputs and outputs of the packet processor may be in the form of pairs of opposite-facing components, the optical network interfaces may also be in the form of optical IOs, each including an optical input channel and an optical output channel. In some embodiments, each optical input channel may include an optical input fibre, and the optical output fibre may include an optical output fibre. Along a similar vein, the electrical ports may be in the form of electrical IOs, each including an electrical input channel and electrical output channel, where "input" and "output" are relative to the leaf switch module, rather than the fabric.

In preferred embodiments of the present invention, the packet processor (or packet processors) are arranged only to switch the first plurality of optical/electrical signals from the optical network interfaces to the electrical network interfaces, and the switch the second plurality of optical/electrical signals from the electrical network interfaces to the optical network interfaces. In other words, the leaf switch module includes no routes which are able to switch optical signals from one optical network interface to another optical network interface without having to pass out of the leaf switch module via an electrical network interface. Similarly, there are no routes provided directly between one electrical network interface and another electrical network interface. While this means that every transmission of a signal from one optical network interface to another optical network interfaces must eventually go via the electrical fabric, the design of the leaf switch module is greatly simplified.

In embodiments of the first, second, and third aspects of the present invention, it is preferable that the leaf switch module has a pluggable form factor. By "pluggable", it should be understood that the device can be plugged in and out of a socket with no requirement for gluing or soldering etc. This is beneficial if the device needs to be replaced within an optoelectronic switch, e.g. in order to upgrade the switch, or to replace a damaged component. It is preferred that the leaf switch module is "hot pluggable", i.e. that it can be plugged or unplugged without having to disconnect power from the optoelectronic switch and without having to close down the system.

It is clear from the above description that the leaf switches of any or all of the previous three aspects of the invention enable the implementation of network architectures built upon such switch modules that scale linearly up to a certain point without increased oversubscription, while achieving the same performance, and which are able to provide advanced features on par with those offered by high-end electrical switches, and which are far more advanced than features offered by simple transceivers. A fourth aspect of the invention therefore provides an optoelectronic switch which incorporates the leaf switches of any previous aspect of the invention, and achieves the advantages set out earlier in this paragraph. More specifically, a fifth aspect of the present invention provides an optoelectronic switch including:

a plurality of leaf switch modules according to any one of the previous aspects of the invention;

a plurality of spine switch modules, each having a plurality of electrical network interfaces;

an electrical fabric, arranged to provide an interconnecting region between the electrical ports of the plurality of leaf switches, and the electrical ports of the plurality of spine switches.

Broadly speaking, the external client devices are connected to the leaf switches only. Signals in the form of packets of data are received at the leaf switches, e.g. via an optical fibre, which are then converted to electrical signals, and switched by the packet processor to an appropriate electrical port on that leaf switch. The signal is then transferred across the electrical fabric, and is received at an electrical network interface of one of the spine switches. Electronics within the spine switch then switches the signal to an appropriate electrical network interface of the same spine switch, and into the electrical fabric. Then, the signal arrives at another electrical network interface of one of the plurality of leaf switches, where it is switched and converted back into an optical signal, which is transferred to another of the external client devices via one of the optical network interface on that leaf switch.

In preferred embodiments, the plurality of electrical network interfaces on a given spine switch modules is arranged to receive an electrical signal from the electrical fabric. Preferably, each spine switch module is configured to switch an electrical signal received from the electrical fabric from one of the plurality of electrical network interfaces to another of the plurality of electrical network interfaces. Specifically, the spine switch module preferably includes a switching element having a plurality of inputs and a plurality of outputs, wherein each of the inputs is arranged to receive an electrical signal from a respective electrical network interface and each of the outputs is arranged to transmit an electrical signal to a respective electrical network interface. In such cases, the switching element is arranged to switch an electrical signal received at one of the plurality of inputs to an output of the plurality of outputs. The switching element may be in the form of an electrical packet switch like an electrical crossbar switch. The spine switch modules may also each include a packet processor, which may be arranged to perform the switching function.

In preferred embodiments, the electrical fabric includes a connection from an electrical network interface on each leaf switch module to an electrical network interface on each spine switch module. This ensures that there is a route in the electrical fabric from each leaf switch modules to each spine switch module.

Optoelectronic switches according to the fourth aspect of the invention cannot be made using the prior art components shown in FIGS. 4A to 4D and described in the "Background" section of this application. It is simply not possible to build such an optoelectronic switch from transceivers alone (FIG. 4A), since they lack packet processing and switching capabilities. Using electrical switch modules alone (FIG. 4B) would only be possible for very small-scale systems, since the higher the speed of the interconnection links, the lower the reach of those electrical links within a given power budget. Optical links provide a much higher reach for the same speed and power budget, but require the use of transceivers, one per link. The current state of the art arrangement is to use electrical switches in combination with transceivers, wherein electrical links are replaced with optical links and transceivers. However, this solution does not reduce the number of discrete elements, and does not provide sufficient performance (due to loss of path availability), nor features such as buffering, congestion detection, load balancing. Purely optical switches (FIG. 4C) do not provide the same packet processing capability and fast packet switching abilities of electrical switches. They also lack a large number of features that are required to provide high-performance communication (e.g. buffering, load balancing, congestion detection, packet classification).

Switch modules along the lines of that shown in FIG. 4D require an optical fabric. These switches also provide a lower radix than electrical switches (two to eight times less). So, more levels (and thus latency) are therefore required to provide the same scalability as the present invention.

Further optional features of the invention are set out below.

BRIEF DESCRIPTION OF THE DRAWINGS

Embodiments of the present invention will now be described in detail with reference to the accompanying drawings, in which.

DETAILED DESCRIPTION OF THE DRAWINGS

Figure 1:
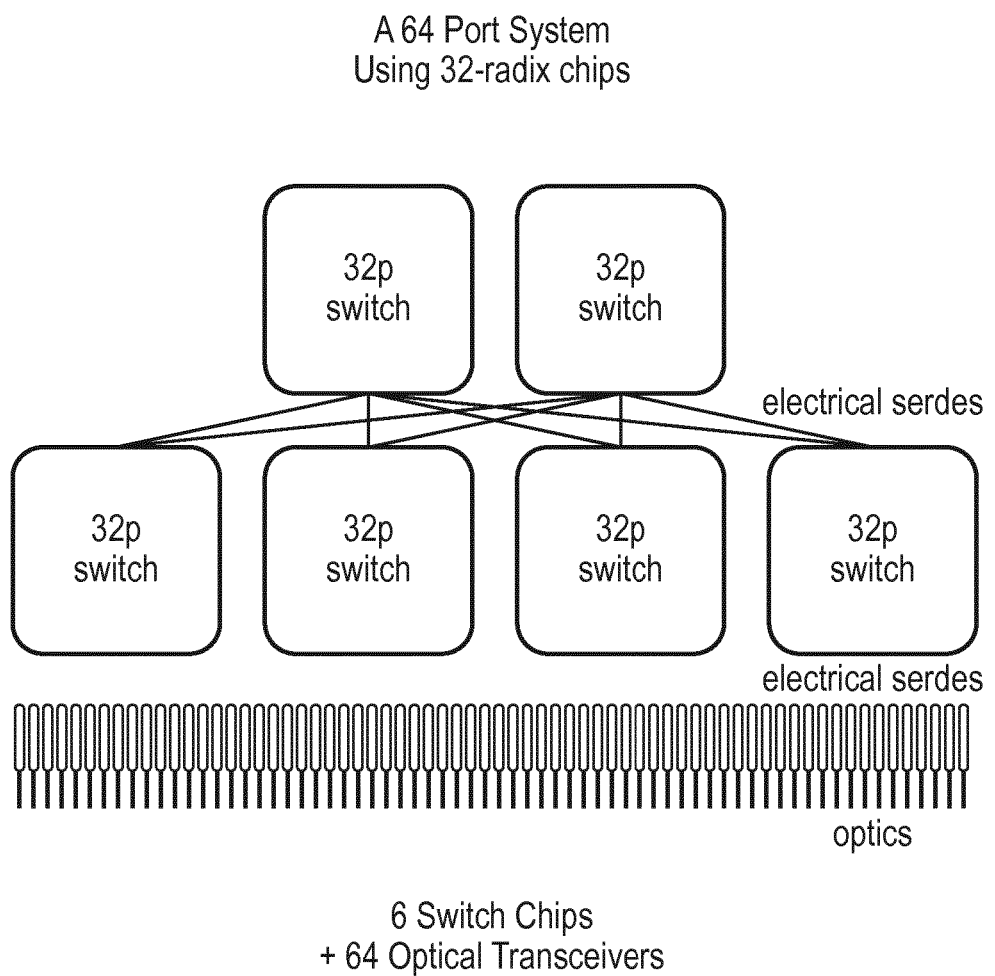
FIG. 1 shows a known arrangement of an optoelectronic switch.
Figure 2:
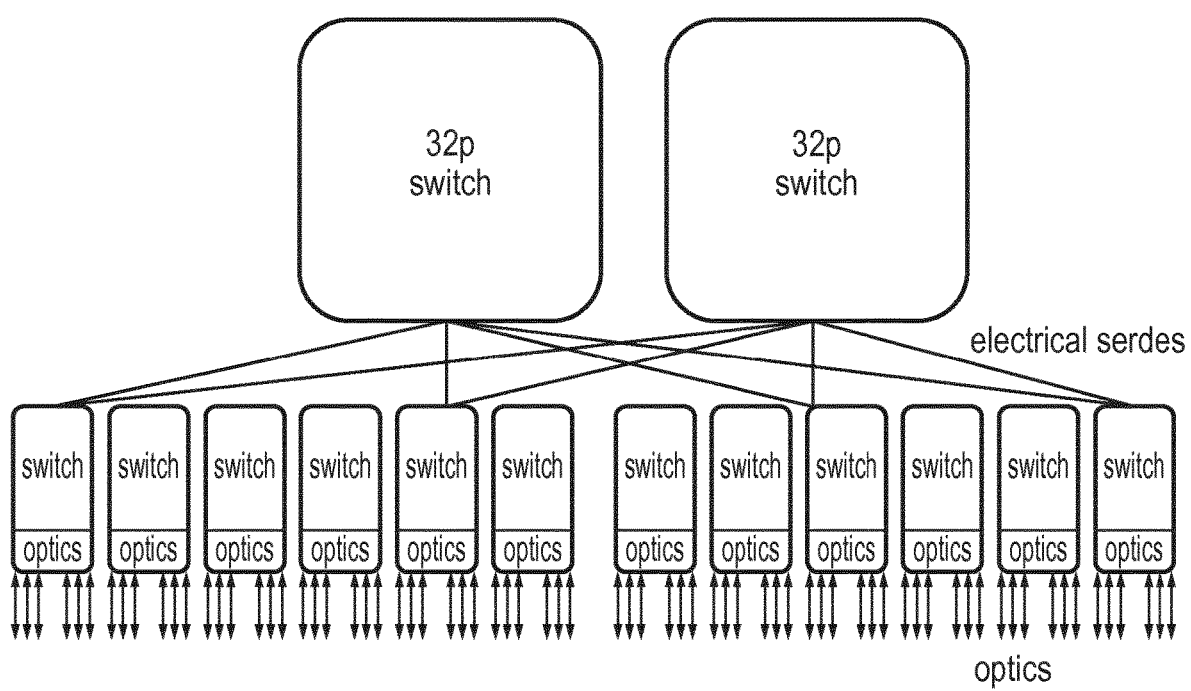
FIG. 2 shows an optoelectronic switch including leaf switch modules according to the first, second and third aspects of the present invention.

A comparison of FIGS. 1 and 2 illustrates some of the advantages of the present invention. In both cases a schematic of an optoelectronic switch with C=64 client ports is shown. The invention is of course in no way limited to a 64 port arrangement, this is merely illustrative.

FIG. 1 shows a traditional two-tier folded Clos network, which includes switch ASICs and optical transceiver modules (the narrow rectangle modules lined up along the bottom of the drawing). Traditionally, all of the switch ASICs employed within the network are identical, since switch ASIC vendors typically try to maximize the switching capacity of their switch ASIC in a given CMOS technology: there is no economic incentive to develop switch ASICs of different (i.e. smaller) capacities. In FIG. 1, the switch ASICs have a radix R=32. In this application, the term "radix" should be taken to refer to the total (i.e. fabric-side and client-side) number of ports on a switch module, or a switch ASIC. In order to effect non-blocking operation for C=R client ports, only one ASIC is required. However, in order to extend to C=2R client ports, the arrangement shown in FIG. 1 is required, with four leaf switches (i.e. those in the lower tier, connected to the optical transceiver modules), and two spine switches (i.e. those in the upper tier). So, to double the number of client ports C from R to 2R requires a six-fold increase in the number of switch ASICs. Accordingly the cost per client port increases threefold.

For network configurations in which R is large (e.g. 32 or 64), and that ratio of C/R is small (e.g. 2 to 4), the architecture shown in FIG. 1 is not economical. Such configurations are common in chassis switches such as the Facebook 6-pack and Backpack.

Instead a scaling factor of 2 to 4 could instead be achieved by combining small-radix switch ASICs with large-radix switch ASICs. For example, the four 32-port leaf switches of FIG. 1 may be replaced with thirty-two 4-port leaf switches, each having two ports facing up and two ports facing down. The present invention, as is shown in FIG. 2, features the integration of a low-radix electronic packet switch with several optical transceiver modules in a packet switching optical module (herein, "PSOM"—this is the same as the leaf switch modules according to the first four aspects of the present invention and which are employed in the fifth aspect of the invention) that integrates CMOS-based packet switching digital logic with analogue electrical IO along with silicon-photonics based optical IO, enabling packet forwarding and load balancing from electrical to optical ports and vice versa.

Such an architecture enables the network architecture shown in FIG. 1 to be re-partitioned as shown in FIG. 2. In the arrangement shown in FIG. 2, the PSOM is arranged to provide electrical ports to the spine switch ASICs and optical ports towards the client ports. This arrangement effectively collapses the leaf switch tier and the optical transceivers modules shown in FIG. 1 into a single tier of PSOMs in FIG. 2. In this architecture, doubling the number of client ports to 2R, only two switch ASICs and R PSOMs are required (assuming a total of four ports per PSOM), an improvement over the arrangement of FIG. 1. This results in substantially reduced power consumption and reduced system cost.

The PSOM can be configured to have $P_{opt}$ optical ports with $P_{opt} \leq M+N$ and to have $P_{ele}$ electrical ports with $P_{ele} \leq M$, where for any specific PSOM configuration $P_{opt}+P_{ele} \leq M+N$.

Therefore, the proposed invention enables network configurations in which the required number of switch ASICs and PSOMs scales linearly with the number of client ports N. The primary reason for the improved scalability is the integration of the transceiver function and switching function as described in detail in the "Summary of the Invention" section, however, the configurability of the ports allows additional improved scalability and also much improved flexibility.

Linear scaling only applies up to a certain number of client ports C, depending on the number of optical ports $P_{opt}$ per PSOM. The maximum number of client ports achievable using one tier of switch ASICs equals $C_{max}=R*P_{opt}$. If each PSOM is provided with an equal number of electrical and optical ports, $P_{ele}=P_{opt}$, then a network configuration with full bisection bandwidth can be constructed.

To achieve a further reduction in the number of switch ASICs for a given number of client ports C, PSOMs providing $P_{opt}>P_{ele}$ may be deployed in an oversubscribed network configuration. For example, with R=32, $P_{opt}=4$ and $P_{ele}=2$, a 2:1 oversubscribed network configuration with 128 client ports could be configured using 2 instead of 4 switch ASICs and 32 PSOMs.

In another embodiment, a PSOM may provide the capability to configure some of its ports as either electrical or optical ports, such that $P_{opt}$ and $P_{ele}$ can be varied while the total PSOM capacity remains constant. For example, a PSOM with a total of P=8 with (at least) two reconfigurable ports could be configured in a non-oversubscribed configuration $P_{opt}=P_{ele}=4$, or in a 3:1 oversubscribed configuration with $P_{opt}=6$ and $P_{ele}=2$. In combination with 32-port switch ASICs, the latter would enable N=6*32=192 client ports.

The client-facing ports of a PSOM may operate at a different data rate than the network-facing ports, where the network-facing ports generally run at an equal or higher data rate. The port data rate is preferably an integer multiple of the physical lane rate. This way, a PSOM with 4×100 G optical client ports may also serve up to 8×50 G optical client ports if the lane rate is 50 G, or up to 16×25 G client ports if the lane rate is 25 G.

In a preferred embodiment, a PSOM is packaged in a pluggable module, where the pluggable module also comprises a laser unit. Multiple such pluggable modules may be plugged into a slots on a line card as part of, e.g., a chassis switch. The main advantage of pluggability is that it enables front-panel serviceability, i.e., defective modules rapidly and easily be replaced in the field.

In another embodiment, a PSOM is packaged in an MSA (Multi-Source Agreement) form factor for pluggable optical transceivers, in particular QSFP-DD (Quad Small Form-factor Pluggable-Double Density) or OSPF (Octal Small Form-factor Pluggable), both of which are initially targeted at supporting 400 G Ethernet. The corresponding PSOM would provide 400 G of electrical bandwidth and 400 G of optical bandwidth. Such pluggable transceiver form factors place stringent constraints physical dimensions and power dissipation, which pose a technical feasibility challenge for the addition of the packet switching functionality. The advantages of pluggable modules over fixed ones are i) the possibility of field replacement (or upgrading) of failed modules, ii) the elimination of optical connections from PSOM to front panel (the PSOM itself directly provides the optical connector receptacles to connect client links), and iii) circumvention of module vendor lock-in.

Drawbacks of pluggable modules are that i) the achievable scaling factor is limited by the number of electrical lanes supported, ii) electrical signal paths may be longer compared to linecard-mounted PSOMs, and ii) there are no provisions for high-bandwidth management and control interfaces. Therefore, larger systems are supported by another embodiment in which the PSOM modules are surface-mounted directly onto line cards, and their optical ports are attached to faceplate-mounted optical connectors (e.g. MTP/MPO or LC). This architecture substantially relaxes the physical constraints (dimensions, power) on the PSOM module compared to the pluggable embodiment, enabling PSOM modules with larger capacity and/or larger feature sets.

In a preferred embodiment, a PSOM module provides the capability to switch data packets from optical ports to electrical ports and vice versa. In this embodiment, switching of data packets from an optical port to another optical port or from an electrical port to another electrical port is not provided, implying that all packets must traverse the spine layer of switch ASICs. This approach simplifies the design of the PSOM, and leverages the feature set of the switch ASICs, which may exceed that of the PSOM.

The switching functionality provided by a PSOM serves to provide connectivity from any of the optical ports to any of the electrical ports and vice versa. This connectivity enables the implementation of a load balancing capability, where data packets entering on one side (e.g. on the optical ports) can be evenly load balanced across ports on the other side (e.g. the electrical ports). Such load balancing is a key capability of a PSOM. In the reverse direction, the switching functionality enables forwarding (e.g. bridging or routing) directing data packets to specific output ports as determined e.g. by information stored in forwarding tables retrieved based on data packet header information.

In a preferred embodiment, a PSOM provides Bridge Port Extension (IEEE 802.1BR) capability. In another embodiment, a PSOM additionally provides Ethernet Bridging (Layer 2) capability. In a further embodiment, a PSOM additionally provides IP routing capability (Layer 3).

As part of its switching function, a PSOM also provides the capability to perform load balancing of the traffic ingressing on its client ports across its network ports. This capability is especially useful in multi-tier Folded Clos architectures, where there are multiple paths, all of the same length, to every other leaf. Load balancing attempts to achieve an equal load distribution across all paths to a given destination leaf.

A PSOM may base its forwarding decision for a given packet on information contained within the packet's header(s). To this end, the PSOM may provide capabilities for packet header parsing, packet filtering tables, access control lists, and routing lookup tables.

Furthermore, a PSOM provides electronic packet buffers to temporarily store packets that cannot immediately be forwarded, to avoid excessive packet drops in case multiple packets simultaneously contend for the same optical or electrical port.

The packet processing features outlined above distinguish a PSOM from conventional "dumb" transceiver modules; moreover, its integrated optical ports differentiate a PSOM from conventional electronic packet switching modules.

Other features that a PSOM may provide include:
Line rate forwarding for all packet sizes
Quality of Service (QoS)
Link Aggregation Groups (LAG)
Virtual LANs (VLAN)
Priority Flow Control (PFC)
Enhanced Transmission Selection (ETS)
Multicast/Broadcast
L3 Routing
Speed Conversion
Statistics gathering The embodiments described above correspond to chassis switch architectures in which a tier of PSOMs is connected via electrical connections, e.g. via electrical backplane traces, to a tier of switch ASICs, whereas the PSOMs optical ports are client-facing. This corresponds to a typical network architecture in which servers within a rack are connected electrically to a Top-of-Rack (TOR) switch in the same rack, and a tier of Aggregation chassis switches interconnects the TOR switches via optical links. In this scenario, the PSOMs are part of the chassis switches.

The PSOM concept is also applicable to network topologies other than Folded Clos. For example, in an RPFabric topology (as described in WO2017/077093 and WO2016/170357), PSOMs could be used as the leaf switches, with the electrical ports facing the clients and the optical ports connected to the spine switches. For example, a PSOM configuration with 12 ports configured as $P_{ele}=3$ and $P_{opt}=9$ would be applicable to construct a 3-dimensional RPFabric with radix R=12 and C=5,184 electrical client ports, using 1,728 such PSOMs and 1,296 radix-12 spine switches having only optical ports.

PSOMs may also be used to construct indirect network topologies such as multi-dimensional Torus networks. In such a Torus network, the physical distance to neighboring switching nodes along some ("inner") dimensions may be short enough to be covered by electrical links; a PSOM may be configured to provide electrical connectivity to such proximate neighbors and optical connectivity to more distant neighbors. For example, in a 5D Torus configuration, a 12-port PSOM may provide 2×2=4 electrical ports to connect along the inner two dimensions and 3×2=6 optical ports to connect along the outer three dimensions, plus two electrical or optical ports as client ports.

Figure 3:
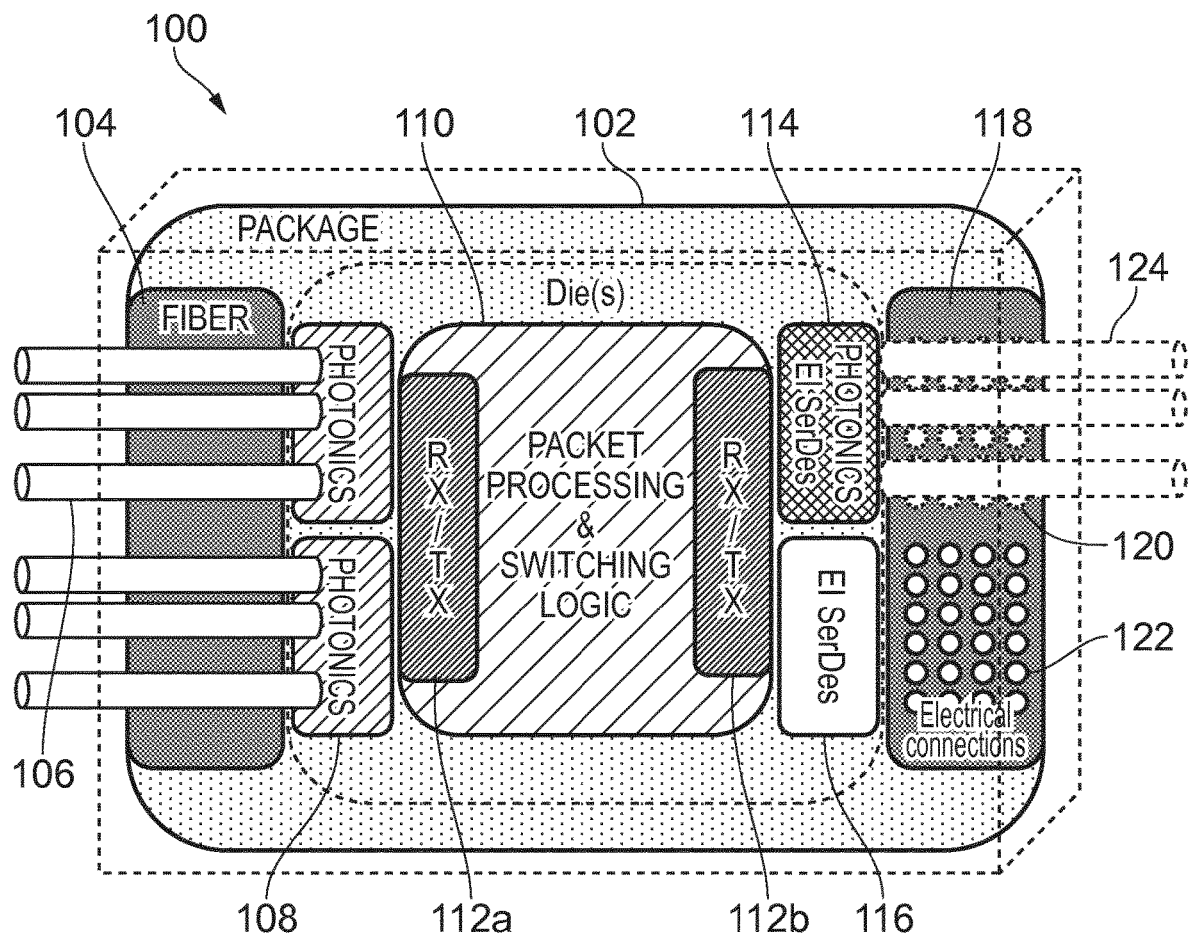
FIG. 3 shows an example of a leaf switch module of the present invention.
Figure 4A:
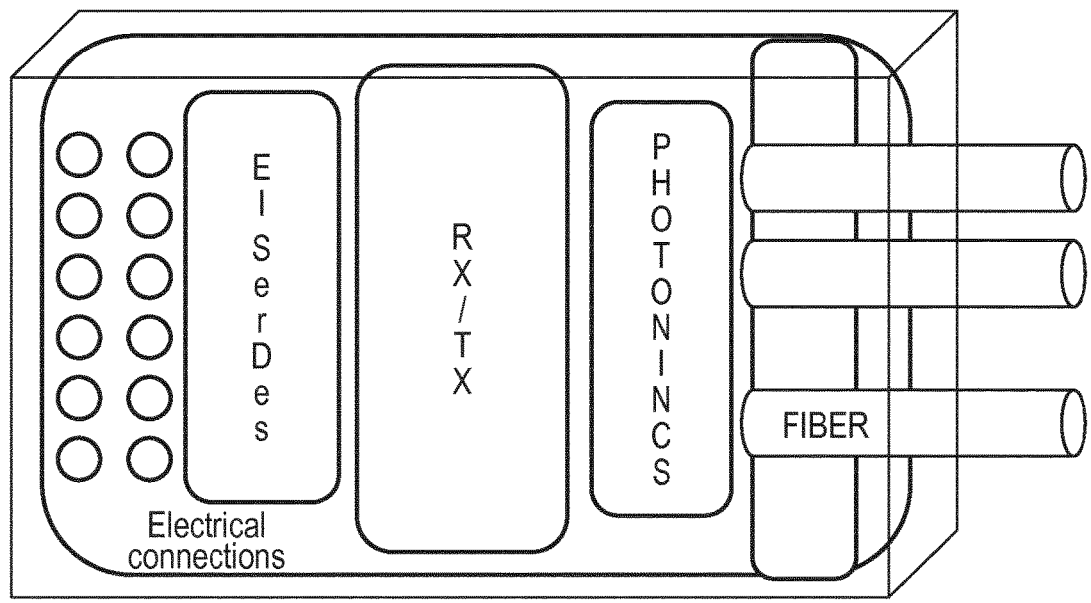
FIGS. 4A to 4D show known optoelectronic components, for illustrative purposes only.
Figure 4B:
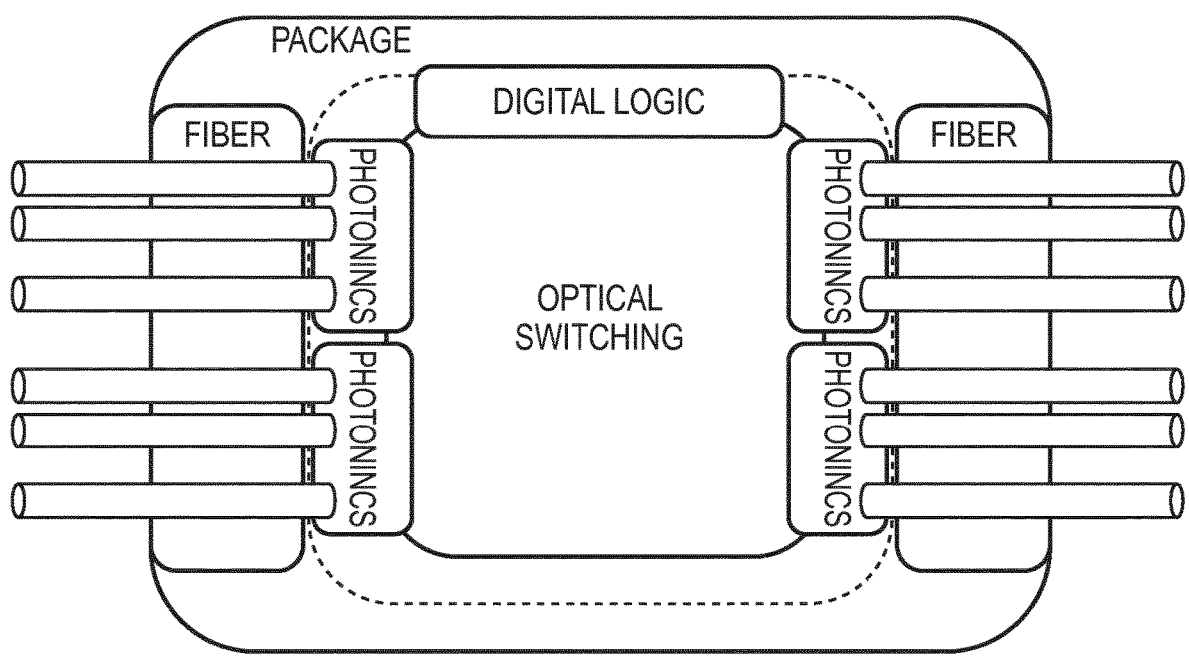
Figure 4C:
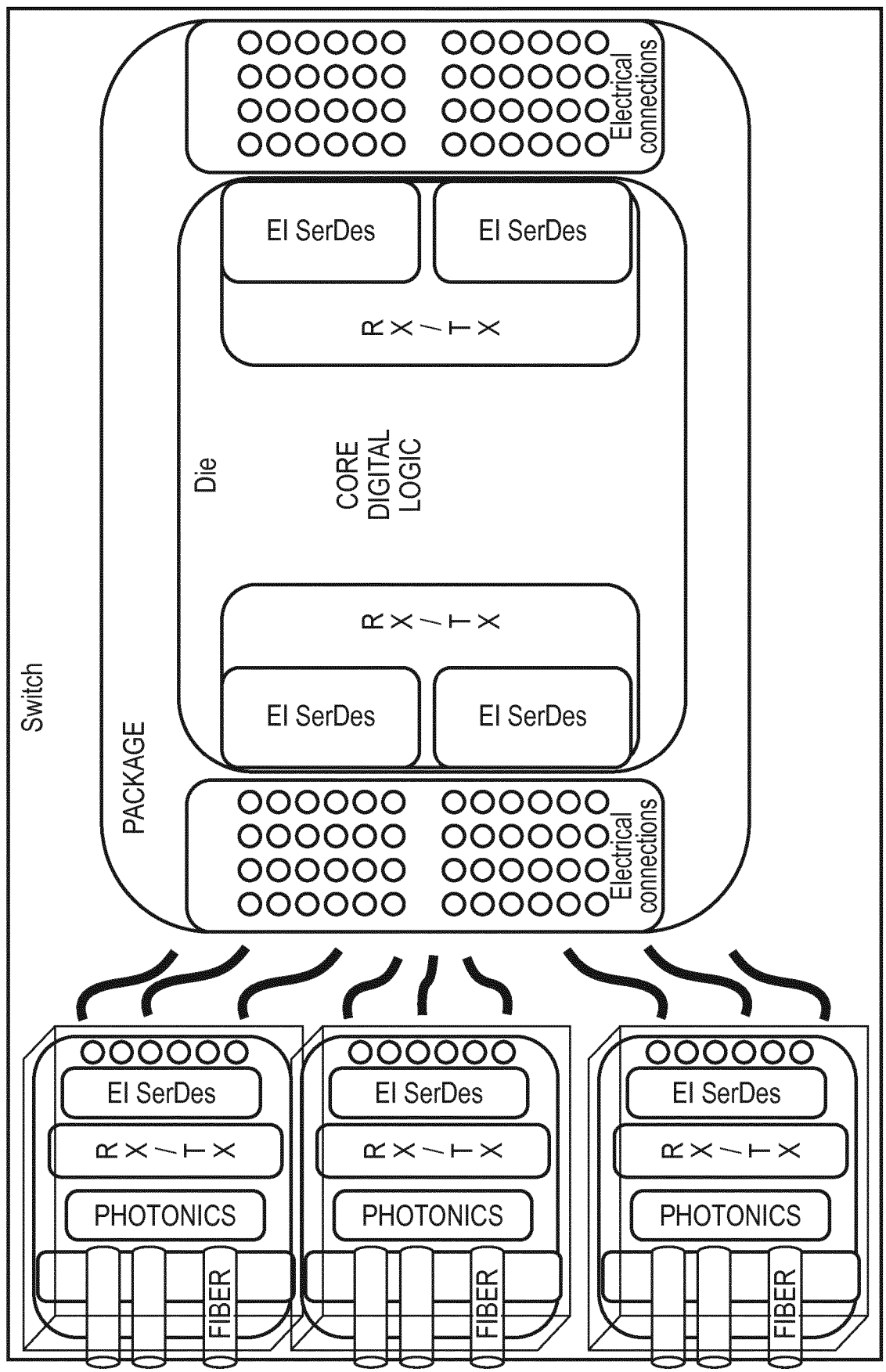
Figure 4D:
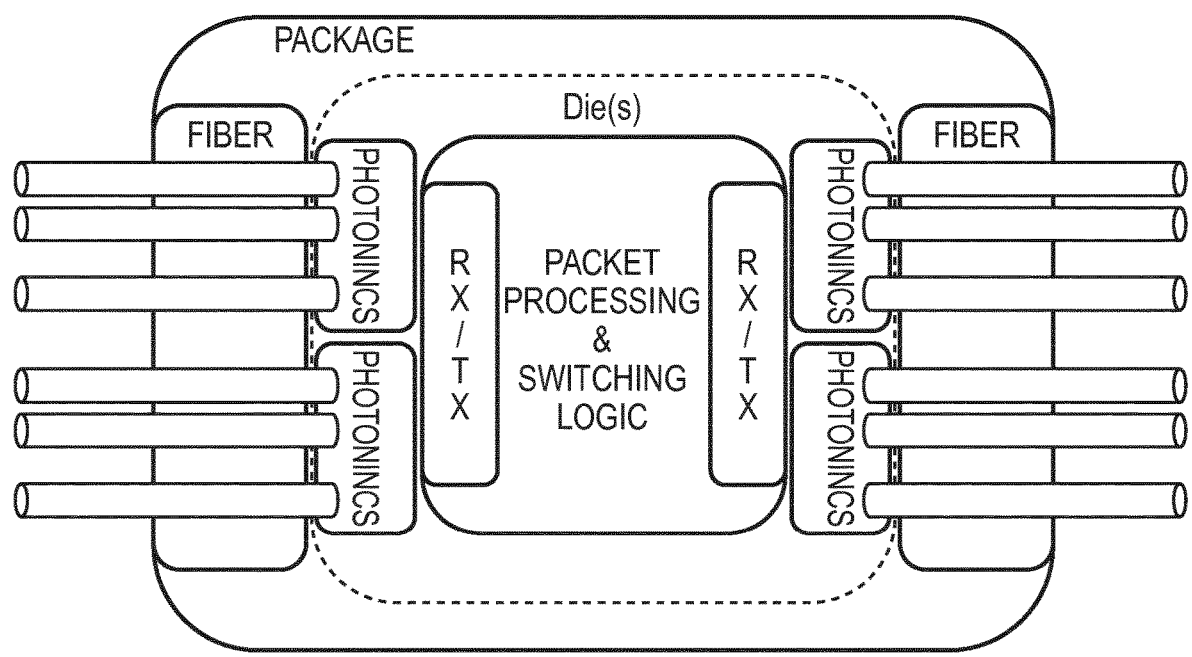

FIG. 3 shows an example of a leaf switch module according to any one of the first three aspects of the invention.

In this application, we first describe the layout of the leaf switch module in simple terms, before briefly describing its operation. At the base of the leaf switch module 100 is a substrate 102, on which all of the other components are mounted. On the left hand side of the leaf switch module 100, there is an attachment portion 104, mounted on the substrate 102. The attachment portion 104 attaches the six optical fibres 106 to the substrate 102. Optical signals from external client devices (not shown) are received at the leaf switch module from these optical fibres 106. Adjacent to the attachment portion 104 there are photonics integrated circuits 108, which include the optical network interfaces (not shown). Though not shown in the drawing, these ICs 108 contain O/E converters and E/O converters as described with reference to the first to third aspects of the invention. In the centre of the leaf switch module 100 there is the packet processor 110, which on each side includes Rx/Tx circuits, 112a, 112b. Adjacent to, and on the right hand side of the leaf switch module 100, there are two modules: an optical/electrical interface module 114, and a SerDes module 116. The optical/electrical interface module 114 provides either optical or electrical network interfaces depending on the configuration of the module during manufacture/assembly. Those interfaces represent the interfaces provided by the configurable ports discussed earlier in the application. There are two situations:

(i) In addition to the optical fibres 106, when an optical network interface is provided, optical signals may also be received from external client devices via optical fibres 124 located on the right hand side of packet processor 110.

(ii) When an electrical network interface is provided, no optical signals are received via optical fibres 124. Rather, the packet processor 110 is connected to the SerDes module.

To the right hand side of these modules, there is another attachment portion 118, on which are mounted two sets of electrical connections 120, 122, associated respectively with the optical/electrical interface module 114 and the SerDes module 116. Also mounted on the attachment portion 118 in the upper region which is associated with the optical/electrical interface module 114 are a plurality of optical fibres 124. The purpose of these fibres 124 will be explained in more depth in reference to the operation of the leaf switch module 100 in the next paragraph.

In operation, a plurality of optical signals arrives at the optical fibres 106 (and optionally, optical fibres 124). The signals are then incident on the optical network interfaces provided by the photonics ICs 108 (and optionally, optical/electrical interface 114). An O/E converter such as a photodiode of the photonics ICs 108 (and optionally, optical/electrical interface 114) then converts each optical signal into a corresponding electrical signal. The generated plurality of electrical signals is then incident upon the Rx portions of the Rx circuit 112a which serve as effective inputs to the packet processor 110. Then, as discussed in detail elsewhere in the application, functions such as load balancing and routing may be performed, in addition to processes such as packet parsing, packet framing, and where necessary, buffering. The signal then exits the packet processor 110 via the Tx on Rx/Tx circuit 112b. Where it is incident on an electrical network interface provided by the optical/electrical interface 114. The signal then passes through the SerDes module 116 where serialization takes place, before being transmitted to the electrical fabric. This paragraph and the one before describe the "upward" transmission of a signal, i.e. from client device to fabric.

We now describe the "downward" transmission of a signal, i.e. from fabric to client device. This is effectively the reverse of the upward transmission process described above. The plurality of electrical connections 120 receive a respective plurality of electrical signals from the electrical fabric (not shown). The electrical signals are then incident on the Rx of Rx/Tx circuit 112b. Deserialization then takes place at the SerDes module 116, before transmission of the deserialized electrical signals to an electrical network interface provided by the optical/electrical interface 114. From there, they are incident on the Rx on the Rx/Tx circuit 112b of the packet processor 110. Again, the signals are switched to the Tx of the Rx/Tx circuit 112a of the packet processor 110, where similar processes such as packet parsing, packet framing, and buffering may take place. From the Tx of Rx/Tx circuit 112a, the signals pass to a modulator which may form part of either photonics IC 108 or optionally, optical/electrical interface 114, wherein they are converted to a plurality of optical signals, which are then transmitted to external client devices via optical fibres 106, and optionally 124.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention. All references referred to above are hereby incorporated by reference.

The invention claimed is:

1. A leaf switch module for use in an optoelectronic switch, the leaf switch module including:
   a plurality of optical network interfaces, arranged to receive a plurality of optical signals, each optical signal received from an external client device;
   a plurality of optical-to-electrical converters, each arranged to convert a respective optical signal of the plurality of optical signals into a corresponding electrical signal, to generate a plurality of electrical signals;
   a plurality of electrical network interfaces; and
   a packet processor arranged to switch each of the plurality of electrical signals towards a respective electrical network interface of the plurality of electrical network interfaces, each of the electrical network interfaces arranged to transmit a respective electrical signal of the plurality of electrical signals to an electrical fabric,
   wherein an interface selected from among the electrical network interfaces and the optical network interfaces is provided by a configurable port including a first circuit configured to provide an electrical network interface and a second circuit configured to provide an optical network interface, and
   wherein the configurable port is configured to have the first circuit selected to provide the electrical network interface or to have the second circuit selected to provide the optical network interface.

2. A leaf switch module according to claim 1, including non-configurable ports, wherein:
   the optical network interfaces are provided by a combination of non-configurable ports and configurable ports; and
   the electrical network interfaces are provided by configurable ports.

3. A leaf switch module according to claim 1, wherein the optical network interfaces, the optical-to-electrical converters, the packet processor and the electrical network interfaces are all part of the same integrated package.

4. A leaf switch module according to claim 1, wherein the optical network interfaces are arranged to receive the respective optical signals from the external client device via a respective optical fibre.

5. A leaf switch module according to claim 1, wherein the packet processor includes:
   a plurality of downward-facing inputs, each configured to receive a respective electrical signal of the plurality of electrical signals;
   a switching component; and
   a plurality of upward-facing outputs,
   wherein, once an electrical signal is received by a respective one of the downward-facing inputs of the packet processor, the switching component is configured to perform switching in an upward direction, in which that electrical signal is switched to a respective one of the plurality of upward-facing outputs, based on information contained in the electrical signal.

6. A leaf switch module according to claim 1, wherein:
   the packet processor is in the form of an electronic integrated circuit,
   the optical-to-electrical converters are in the form of photodetectors which are located on one or more photonics chips, the photonics chips being coupled to the electronic integrated circuit, and
   the one or more photonics chips and the electronic integrated circuit are integrated into a single module.

7. A leaf switch module according to claim 1, further including a SerDes module coupled to the packet processor.

8. A leaf switch module according to claim 1, further including a selector configured to select the first circuit or the second circuit.

9. A leaf switch module for use in an optoelectronic switch, the leaf switch module including:
   a plurality of electrical network interfaces, each arranged to receive a respective electrical signal of a plurality of electrical signals from an electrical fabric;
   a packet processor;
   a plurality of electrical-to-optical converters; and
   a plurality of optical network interfaces,
   wherein:
   the packet processor is arranged to switch each of the plurality of electrical signals towards a respective electrical-to-optical converter of the plurality of electrical-to-optical converters;
   each of the plurality of electrical-to-optical converters is arranged to convert a respective electrical signal of the plurality of electrical signals into a corresponding optical signal, to generate a plurality of optical signals;
   each of the optical network interfaces is arranged to receive a respective optical signal of the plurality of optical signals, and to transmit that optical signal towards an external client device;
   an interface selected from among the electrical network interfaces and the optical network interfaces is provided by a configurable port including a first circuit configured to provide an electrical network interface and a second circuit configured to provide an optical network interface; and
   one from among the first circuit and the second circuit is usable, and the other one from among the first circuit and the second circuit is not usable.

10. A leaf switch module according to claim 9, including non-configurable ports, and configurable ports, wherein:
   the optical network interfaces are provided by a combination of non-configurable ports and configurable ports; and
   the electrical network interfaces are provided by configurable ports.

11. A leaf switch module according to claim 9, wherein the optical network interfaces, the electrical-to-optical converters, the packet processor and the electrical network interfaces are all part of the same integrated package.

12. A leaf switch module according to claim 9, wherein the packet processor includes:

a plurality of upward-facing inputs, each configured to receive a respective electrical signal of the plurality of electrical signals;

a switching component; and a plurality of downward-facing outputs, wherein, once an electrical signal is received by a respective one of the upward-facing inputs of the packet processor, the switching component is configured to perform downward switching, in which that electrical signal is switched to a respective one of the plurality of downward-facing outputs, based on information contained in the electrical signal.

13. A leaf switch module according to claim 9, wherein:

the packet processor is in the form of an electronic integrated circuit, the electrical-to-optical converters are in the form of modulators which are located on one or more photonics chips, the photonics chips being coupled to the electronic integrated circuit, and the one or more photonics chips and the electronic integrated circuit are integrated into a single module.

14. A leaf switch module for use in an optoelectronic switch having:

a plurality of optical network interfaces;

a plurality of optical-to-electrical converters;

a first packet processor;

a plurality of electrical network interfaces;

a second packet processor; and a plurality of electrical-to-optical converters, wherein:

the plurality of optical network interfaces is arranged to receive a first plurality of optical signals, each optical signal of the first plurality of optical signals received from an external client device;

each optical-to-electrical converter in the plurality of optical-to-electrical converters is arranged to convert a respective optical signal of the first plurality of optical signals into a corresponding electrical signal, to generate a first plurality of electrical signals;

the first packet processor is arranged to switch each of the first plurality of electrical signals towards a respective electrical port of the plurality of electrical network interfaces, each of the electrical network interfaces arranged to transmit a respective electrical signal of the first plurality of electrical signals to an electrical fabric, and wherein:

the plurality of electrical network interfaces is arranged to receive a respective electrical signal of a second plurality of electrical signals from the electrical fabric;

the second packet processor is arranged to switch each of the second plurality of electrical signals towards a respective electrical-to-optical converter of the plurality of electrical-to-optical converters;

each of the plurality of electrical-to-optical converters is arranged to convert a respective electrical signal of the second plurality of electrical signals into a corresponding optical signal, to generate a second plurality of optical signals; and each of the optical network interfaces is arranged to receive a respective optical signal from the second plurality of optical signals, and to transmit that optical signal to the external client device, wherein an interface selected from among the electrical network interfaces and the optical network interfaces is provided by a configurable port including a first circuit configured to provide an electrical network interface and a second circuit configured to provide an optical network interface, and wherein the configurable port is configured to have the first circuit selected to provide the electrical network interface or to have the second circuit selected to provide the optical network interface.

15. A leaf switch module according to claim 14, wherein the optical network interfaces, the optical-to-electrical converters, the first packet processor, the electrical network interfaces, the second packet processor and the electrical-to-optical converters are part of the same package.

16. A leaf switch module according to claim 14, wherein the optical-to-electrical converters and the electrical-to-optical converters are located on the same photonics chip.

17. A leaf switch module according to claim 14, wherein the first packet processor and the second packet processor are separate components, respectively in the form of, or located on a first electronic integrated circuit and a second electronic integrated circuit.

18. A leaf switch module according to claim 14, wherein the first packet processor and the second packet processor are the same, single packet processor.

19. A leaf switch module according to claim 18 where the packet processor includes upward-facing inputs, upward-facing outputs, downward-facing inputs and downward-facing outputs.

20. A leaf switch module according to claim 19, wherein the downward-facing inputs and the downward-facing outputs are located together in pairs, referred to as client-side IOs of the packet processor.

21. A leaf switch module according to claim 19, wherein the upward-facing outputs, and the upward-facing inputs are located together in pairs, referred to as fabric-side IOs of the packet processor.

22. A leaf switch module according to claim 18, wherein the packet processor includes a first switching component for switching an electrical signal of the first plurality of electrical signals in an upward direction, and a second switching component for switching an electrical signal of the second plurality of electrical signals in a downward direction.

23. A leaf switch module according to claim 18, wherein the packet processor includes a single switching component arranged to:

switch an electrical signal of the first plurality of electrical signals in an upward direction; and switch an electrical signal of the second plurality of electrical signals in a downward direction.

24. A leaf switch module according to claim 14, wherein the optical network interfaces may be in the form of optical IOs, each including an optical input channel and an optical output channel.

25. A leaf switch module according to claim 14, wherein the electrical network interfaces are in the form of electrical IOs, each including an electronical input channel and an electrical output channel.

* * * * *